July 26, 1932.　　　F. O. CLIZBE　　　1,868,969
ELECTROMAGNETIC BRAKE
Filed Feb. 13, 1929　　　2 Sheets-Sheet 1

Inventor:
Floyd O. Clizbe
By Fred Gerlach
his Attorney.

July 26, 1932.  F. O. CLIZBE  1,868,969
ELECTROMAGNETIC BRAKE
Filed Feb. 13, 1929   2 Sheets-Sheet 2
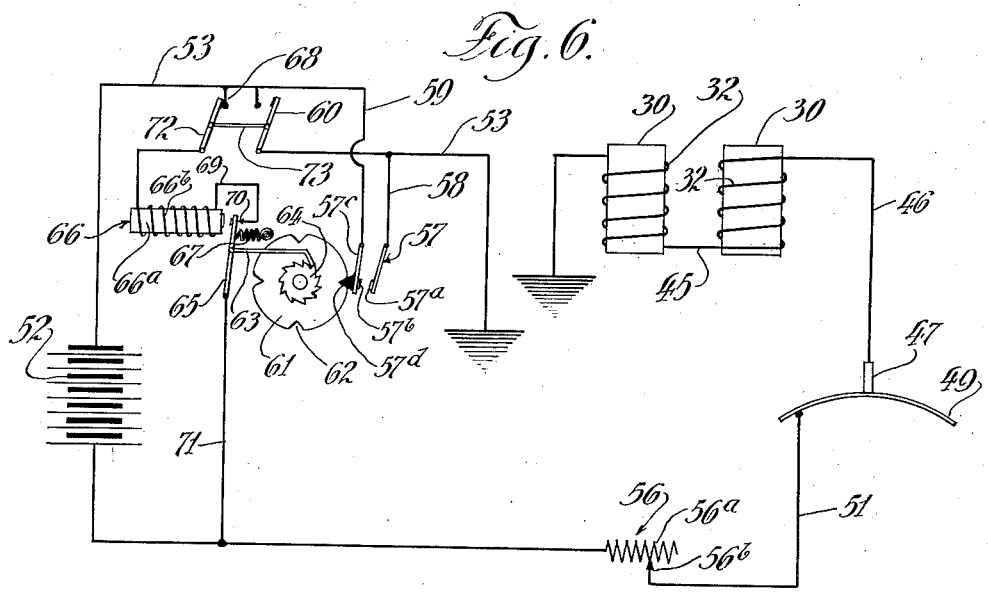
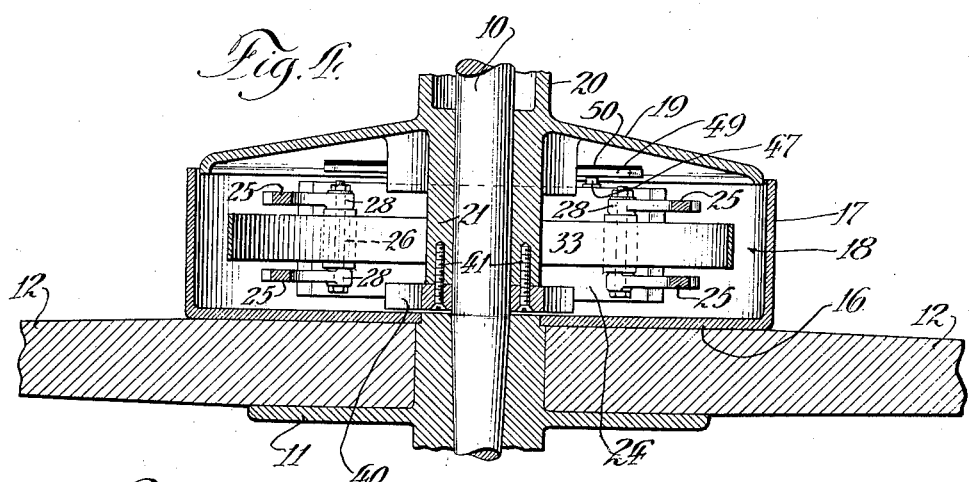
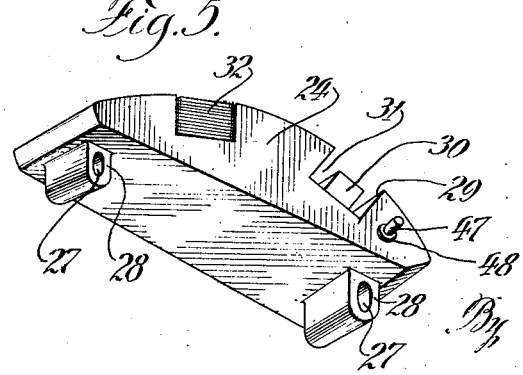
Inventor:
Floyd O. Clizbe
Fred Gerlach
his Attorney Patented July 26, 1932

1,868,969

UNITED STATES PATENT OFFICE

FLOYD O. CLIZBE, OF CHICAGO, ILLINOIS

ELECTROMAGNETIC BRAKE

Application filed February 13, 1929. Serial No. 339,598.

The invention relates to electromagnetic brakes for vehicles.

One object of the invention is to provide an electromagnetic brake in which the circuit for the magnet includes an interrupter device whereby it is automatically opened and closed in rapid succession in order to permit the wheel with which the brake is associated to roll or rotate slowly and thus cause new surfaces of the tire to be presented to the road for braking purposes.

Another object of the invention is to provide a vehicle brake of the electric type which is generally of an improved character.

Other objects and the various advantages of the present invention will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 4 is a section taken on the line 4—4 of Figure 2;

Figure 5 is a perspective of the electromagnetic shoe member; and

Figure 6 is a diagrammatic view of the improved electrical circuit.

Figure 1:
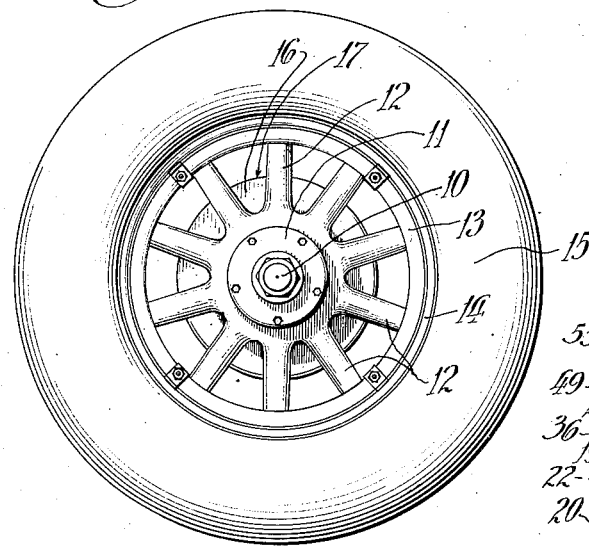
Figure 1 is a side view of a wheel and brake drum of conventional construction.

The invention is exemplified in an electric brake mechanism for use in connection with a vehicle wheel, such, for example, as that illustrated in Figure 1 of the drawings, which comprises an axle 10, a hub 11, spokes 12, a felly 13, a rim 14 and a pneumatic tire 15. A brake drum is positioned adjacent the inner side of the wheel. This drum consists of a disc-like side wall 16 which is bolted to the spokes or is secured in place in any other suitable manner, and an annular wall 17 which is formed integrally with the marginal part of the side wall and projects inwardly therefrom. The walls 16 and 17 together form an open sided cylindrical chamber 18 in which are disposed the various brake elements and operating parts. The open side of the chamber is closed by a member 19 which is held in fixed relation with respect to the chassis or frame of the vehicle. This member is shown as being formed integrally with the axle housing 20. The central portion of the member 19 is provided with a bearing element 21 for the outer end of the axle 10. This element is housed in the cylindrical chamber 18 and terminates a short distance inwardly of the hub 11. A block 22 is united to the inner face of the member 19 and extends upwardly from the bearing element 21. The marginal or rim portion of said member 19 cooperates with the inner edge of the annular wall 17 to prevent water, dirt and other undesirable matter from entering the interior of the brake drum where such matter might prevent the proper operation of the brake elements and associated parts.

Figure 3:
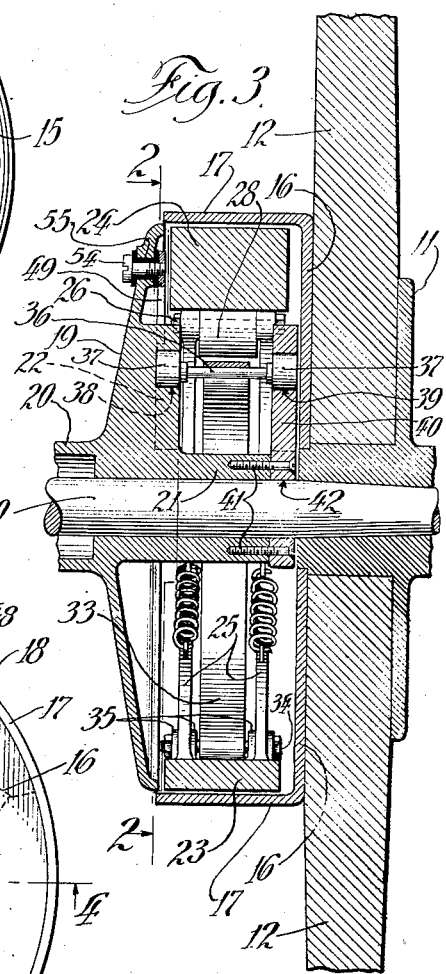
Figure 3 is a section taken on the line 3—3 of Figure 2.

The brake mechanism comprises an arcuate brake shoe 23 which is preferably formed of hard metal and located at the bottom part of the chamber 18. This shoe is adapted to be shifted downwardly into contact with the inner periphery of the wall 17, as more fully described hereafter, to retard or brake the wheel. In addition to the shoe 23, the brake mechanism includes a soft iron shoe-member 24 which is located at the top of the chamber 18 and is positioned diametrically opposite said shoe. The member 24 and the brake shoe 23 are connected together for conjoint rotative movement by four arms 25. These arms are preferably arranged in pairs, the members of each pair being spaced apart as shown more particularly in Figures 3 and 4. The lower ends of the arms are fixedly joined in any suitable manner to the central portion of the brake shoe 23. From the brake shoe, the arms extend upwardly and then outwardly and inwardly to extend around the bearing element 21 and the axle. The upper ends of each pair of arms are provided with a cross-pin or bolt 26 which extends through an elongated slot 27 in a lug 28. The lugs depend from the end portions of the shoe-member 24 and fit between the arms. The slots 27 extend downwardly in substantial parallelism and operate in conjunction with the pins 26 to permit the shoe 23 and the member 24 to move to and from the brake drum and relatively to each other. By providing pin and slot connections of this character, the shoe and member, although connected together for conjoint rotative movement, are individually movable in a radial direction and consequently the brake shoe is free so that it may be shifted into engagement with the periphery of the wall 17 without causing the shoe-member 23 to be pulled inwardly. A characteristic of using connecting arms of the aforementioned character is that the two shoe-members, that is, the brake shoe and the member 23, are positioned in the drum and relatively to each other in such a manner that great efficiency in operation results. In addition, assembly of the brake shoe and shoe-member is facilitated. The lugs 28 and the pins 26 serve to maintain and hold positively the upper ends of the arms 25 in spaced relation.

The outer face of the soft iron shoe-member 24 is curved to conform to the inner periphery of the wall 17 and is cut transversely and longitudinally, as at 29, to form a pair of central or intermediate core pieces 30 and surrounding sockets 31. The latter, because of the specific type of cutting employed, are substantially square in cross section. Coils 32 of wire are disposed in the sockets 31 and are wrapped around the core pieces to form of the member 24 an electromagnet. This magnet, when energized, is attracted to the wall 17 and tends to rotate therewith. Due to the arms 25, shift movement of the magnet is imparted to the brake shoe 23 with the result that this shoe is rotated in the direction of the drum. The conjoint movement of the magnet and shoe is taken advantage of by what may be termed a lever system to press the shoe outwardly into braking relation with the drum.

Figure 2:
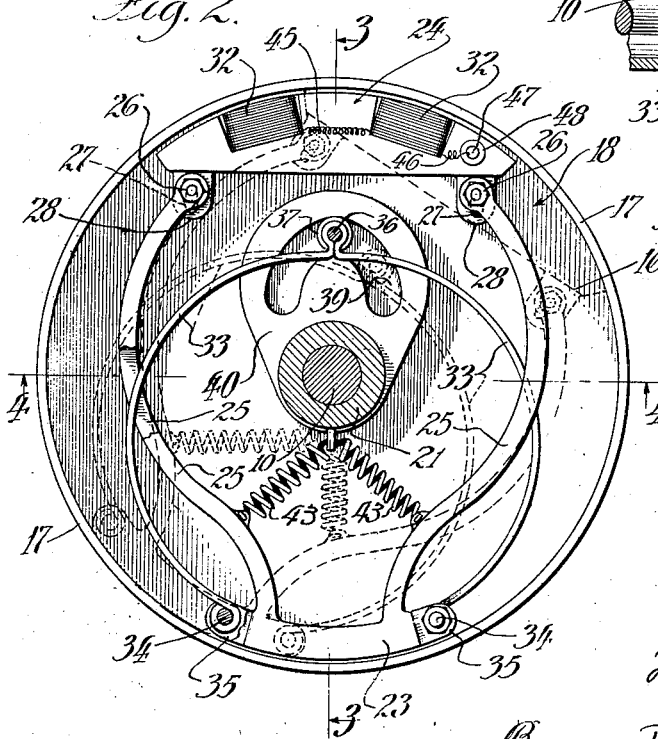
Figure 2 is a side view of a brake mechanism embodying the invention, illustrating the same in its operative or assembled position relatively to the drum.

The lever system comprises a spring strip 33 which is bent so as to be of substantially circular conformation. This strip extends around the element 21 and axle and is positioned between the members of each pair of arms 25. The ends of the strip are pivotally connected to the ends of the brake shoe 23 by pins or bolts 34 so that the strip is rotated or shifted in response to movement of the shoe and magnet. Each of the bolts has the ends thereof anchored in a pair of lugs 35 which are formed integrally with each end of the brake shoe 23 and are spaced one from the other. The ends of the spring strip 33 extend between the lugs and are bent so as to extend around the central portion of the pins 34. The medial part of the spring has rigidly secured thereto a transversely extending shaft or rod 36. The ends of this rod project beyond the side edges of the strip and are provided with rollers 37. These rollers are confined respectively in a pair of oppositely facing substantially semicircular cam slots 38 and 39. The cam slot 38, in which is confined the roller on the inner end of the shaft 26, is formed in the upper end of block 22. The cam slot 39, in which is confined the roller at the outer end of the shaft 36, is aligned with the slot 38 and is formed in the inner face of a block or member 40. The latter is similar in shape to the block 22 and is rigidly connected to the distal end of the bearing element 21 by bolts 41. A circular opening 42 for the axle is formed in the lower end of the member 40. The ends of the cam slots extend downwardly towards the center of the chamber 18 and consequently they are operative, when the shoe and spring are rotated or shifted by the magnet, to receive the rollers 37 and to shift the latter, together with the shaft 36, towards the brake shoe 23 and into the position shown by dotted lines in Figure 2. This inward movement of the shaft causes the central portion of the spring strip 33 to be forced downwardly with the result that the spring-ends are compressed or bent together and tend to press the shoe 23 into firm contact with the inner periphery of the wall 17. Inasmuch as the ends of the cam slots extend towards the center of the chamber, it is manifest that as the rotative movement of the spring strip increases, the force tending to compress the spring increases correspondingly and results in greater frictional retardation of the wheel. The spring strip 33 is of such conformation or length that the brake shoe, when in its normal or inoperative position, is spaced inwardly from the periphery of the wall 17 (as shown by full lines in Figure 2) and consequently the drum is not retarded by drag of the shoe. To restore the brake shoe and associated parts automatically to their inoperative positions when the magnet is deenergized, springs 43 are provided. These springs are anchored to the lower end of the block 22, extend in pairs outwardly in opposite directions and are screwed to the arms 25. They are applied so that they tend to force the rollers 37 into the central or top portion of the cam slots and thereby cause a return shift of the shoe and member 24 as soon as the magnet is deenergized. The spring strip 33, together with the rollers and cam means, exemplify an improved type of so called lever system which operates to force the shoe into its braking position in response to rotary movement and to restore the shoe-members to their respective normal and inoperative positions when the magnet is deenergized. By having the cam slots of semi-circular conformation, as illustrated in the drawings, the braking action takes place during rotation of the drum in either a fore or aft direction. The shoe-member 24 is of such magnetic capacity that when it is energized and drawn into contact with the drum, its tangential traction is greater than the opposing tangential pull of the brake shoe and the force of the extended springs 43. The pressure of said springs, tending to restore the brake shoe and magnet to their inoperative positions, is sufficient to overcome any natural tendency of the magnet, when deenergized, to adhere to the drum. Since the magnet is located at the top of the chamber 18, it normally is spaced from the wall 17 due to the action of gravity and consequently it exerts no retarding force upon the drum.

The coils 32 of the magnetic shoe-member 24 are serially connected together by an insulated conductor 45 which extends between the sockets 31. The free end of one of the coils is grounded. The other coil is connected by an insulated conductor 46 to a brush 47. This brush is slidably mounted in an insulated sleeve 48 which is disposed in one end of the magnetic shoe-member. A spring or similar resilient element (not shown) is utilized to press the brush against an arcuate conductor strip 49. The latter is positioned adjacent the upper part of the member 19 and is spaced therefrom by an insulated plate 50. The conductor strip 49 is connected by a conductor 51 to a source of electrical current, such, for example, as the storage battery 52 of the vehicle with which the brake is associated. A conductor 53 serves to connect the battery 52 to ground. The conductor 51 is secured to a binding post 54 which is electrically connected to the conductor piece 49 and extends through a sleeve 55. The latter is formed of insulating material and passes through the upper portion of the member 19. A rheostat 56, consisting of a resistance element 56$^a$ and a movable contact 56$^b$, is interposed in the conductor 51 so that the magnetic intensity of the electromagnets 30, 32, may be controlled to vary the gripping or adhering characteristics of the shoe-member 24. By running the movable contact 56$^b$ off the resistance element, the circuit may be broken to deenergize the magnetic shoe.

In practice, it has been found, that skidding is effectively avoided and the vehicle is stopped more quickly when the brake mechanism is operated intermittently. This is due to the fact that under the aforementioned condition of operation the wheel is caused to roll and consequently it presents in rotative succession new tire surfaces to the subjacent road or pavement. The present invention contemplates the provision of means for automatically making and breaking the circuit for the magnetic shoe. This means is in the form of an interrupter and is adapted to control a switch 57 which is connected in parallel with the conductor 53. Said switch comprises a stationary contact 57$^a$ which is connected to the conductor 53 by a connector 58, and a movable contact 57$^b$ which is mounted on a spring strip 57$^c$ and is connected to the conductor 53 by a connector 59. A manually operable switch 60 is interposed in the conductor 53 between the connectors 58 and 59. When this switch is open, the switch 57 is operable to control the brake circuit, providing, of course, that the contact 56$^b$ of the rheostat is in engagement with the resistance element 56$^a$. The switch 57 is adapted to be opened and closed automatically by a rotatably mounted wheel 61 which has notches 62 cut in the periphery thereof. These notches are adapted to receive a tooth 57$^d$ on the movable contact 57$^b$ for the purpose of permitting said contact to be shifted out of engagement with the contact 57$^a$ in response to the action of the spring strips 57$^c$. When the peripheral portion of the wheel 61 is rotated into engagement with the tooth 57$^d$ the contact 57$^b$ is forced against the stationary contact to effect completion of the brake circuit. The wheel is rotated by a dog 63 which operates in conjunction with a ratchet 64 fixed to one side of the wheel 61. The dog 63 is attached to a soft iron member 65 which is movably mounted and is oscillated by an electromagnet 66 and a spring 67. The magnet comprises a core 66$^a$ and a coil 66$^b$. A connector 68 connects one end of the coil to the conductor 53 between the battery 52 and the connector 59. The other end of the coil 66$^b$ is connected by a conductor 69 to a contact 70. The latter is adapted to engage against the member 65 when the latter is subject to the pull of the spring 67. Said member 65 is connected to the conductor 51 by a connector 71. When the member 65 is held against the contact 70, the following circuit is established for the electromagnet 66: connector 68, electromagnet 66, connector 69, contact 70, member 65 and connector 71. Upon the completion of this circuit, the magnet operates against the pull of the spring 67 to draw the member 65 away from the contact 70. This results in the circuit being broken and again subjects the member 65 to the action of the spring. The reciprocatory movement of the member operates to cause the dog 63 to rotate the wheel 61 through the instrumentality of the ratchet 64. It is therefore manifest that when the switch 60 is open the brake circuit is controlled by the interrupter mechanism and automatically opened and closed in rapid succession. The circuit for the electromagnet 66 is connected in parallel with the main brake circuit and receives electrical energy from the battery 52.

To dispense with the interrupter mechanism when desired, a switch 72 is provided. This switch is interposed in the connector 68 and is connected by a link 73 to the switch 60. The link 73 is such that when shifted in one direction the switch 60 will be closed and the switch 72 open, and when shifted in the opposite direction, the reverse positioning of the switches is obtained. When the switch 72 is open and the switch 60 is closed, the following direct circuit for the brake mechanism is established: electromagnets 30, 32, conductor 46, brush 47, conductor strip 49, conductor 51, battery 52 and conductor 53.

The operation of the brake will be as follows: Assuming that the drum is rotating and it is desired to apply the brake without interruption in the operation thereof. The link 73 will first be operated to close the switch 60 and open switch 72. Upon proper manipulation of the rheostat-contact 56$^b$ the magnetic shoe member 24 will become energized with the result that said member will be attracted to the inner periphery of the wall 17 and caused to rotate therewith. This rotative movement of the shoe-member is in turn imparted to the brake shoe and spring strip 33 through the medium of the arms 25 and causes said spring to be subjected to the action of the rollers and cam slots and compressed to exert outward pressure upon the shoe. If it is desired to facilitate and increase the braking operation, the contact 56$^b$ is shifted so as to eliminate the resistance element 56$^a$. If it is desired to operate the brake intermittently, the link 73 is shifted so that the switch 60 is opened and the switch 72 is closed. This causes the interrupter mechanism to be rendered operative and results in the automatic making and breaking of the circuit, thereby causing the wheel to roll and present new tire surfaces to the road. When the contact 56$^b$ is shifted out of engagement with the resistance element 56$^a$, the circuit is opened thus causing the electromagnetic shoe-member to become deenergized and the springs 43 to restore automatically the brake shoe to its inoperative or normal position. When the vehicle is driven backwards and the drum is rotated in a reverse direction, the brake is applied in exactly the same manner, the parts, however, turning in the reverse direction.

The brake is free from complicated mechanisms, is positive in its actions, and may be operated with a minimum amount of power inasmuch as the braking force is derived from the motion of the drum.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In combination, a wheel, a brake comprising a drum on the wheel and a shoe, electrically operated means for operating the shoe, a circuit for said means, and means for automatically opening and closing said circuit.

2. In combination, a wheel, a brake comprising a drum on the wheel and a shoe, electromagnetic means for operating the shoe, a switch-controlled circuit for said means, and an electrical interrupter device operative automatically to open and close the circuit in rapid succession and arranged so that it is actuated upon closing of the switch.

3. In combination, a wheel, a brake comprising a drum on the wheel and a shoe, electromagnetic means for operating the shoe, a switch-controlled circuit for said means including a battery, an electrical device for automatically opening and closing the circuit upon closing of the switch, and a circuit for said device including the battery.

Signed at Chicago, Illinois, this 7th day of February, 1929.

FLOYD O. CLIZBE.